UNITED STATES PATENT OFFICE 2,468,482

OIL-RESIN RECLAIMING BLEND AND RECLAIMING METHOD USING THE SAME

Charles Herbert Campbell, Kent, Ohio

No Drawing. Application December 1, 1945,
Serial No. 632,276

6 Claims. (Cl. 260—4)

This invention relates to a new process of reclaiming, the new reclaimed rubber produced by this process, and a new oil-resin blend designed particularly for use in the process.

It has been recognized that blends of coumarone resins with various oils may be used in reclaiming rubbers. The coumarone resins used are the higher molecular-weight coumarone polymers and coumarone-indene copolymers—i. e., such polymers or copolymers with a molecular weight of about 700 and ordinarily of 800 molecular weight or thereabouts. The coumarone resins may be composed entirely or substantially entirely of the coumarone polymers. They may contain indene polymers in substantial amounts. One disadvantage encountered in the use of such a high-molecular-weight resin is that when employed in the amount desired, the resin blooms to the surface of the reclaim.

According to this invention these high-molecular-weight coumarone resins are used together with low-molecular-weight coumarone resins which tend to hold the high-molecular-weight coumarone resin in the reclaim and prevent it from blooming. The higher molecular-weight coumarone resins are used to impart to the reclaims, and particularly reclaims from synthetics, high tensile and abrasion resistance. When used in too high percentages, they tend to increase the tack of the completed reclaim so that it is hard to mill. Low-molecular-weight coumarone resins—that is, coumarone polymers and/or coumarone-indene copolymers (with or without indene polymers) which have a molecular weight not in excess of about 500, such as resins with a molecular weight of 300 or 400—may be used in relatively large percentages without danger of blooming. They give good physical properties to the reclaim but do not increase its tensile and abrasion resistance as the high-molecular-weight compounds do.

These resins are incorporated in the reclaim with a heavy oil to give a desired product. The percentages of such ingredients included in the reclaim will vary with the operation, depending upon such factors as the amount of stock included in the final slab. This may be as low as 75 per cent or lower and may be much higher. For best results different amounts of the resins and oil will be included in the various synthetics and in natural rubber. The following table illustrates what may be thus included to the best advantage in a number of different stocks, whether the reclaiming operation be conducted in a wet digester or pan digester. The heavy oil, whether an oil from coke-oven operation or from some other source, is one substantially all of which distills at a temperature over 250° C. or thereabouts. The figures given are representative and are not to be construed too strictly as defining an exact range.

| Reclaim | High-Mol.-Wt. Coumarone | Low-Mol.-Wt. Coumarone | Heavy Oil |
|---|---|---|---|
|  | Percent | Percent | Percent |
| Natural rubber | 1-4 | 2-8 | 2-6 |
| Recap and retread | 2-4 | 2-4 | 2-6 |
| GR-S | 5-8 | 5-8 | 7-15 |
| Synthetic alone, etc | 5-8 | 5-8 | 7-15 |
| Butyl rubber | 2-4 | 2-4 | 2-8 |

The term "Synthetic alone, etc." is to be construed to cover any of the synthetics except GR-S (rubber-like copolymer of butadiene and styrene), such as neoprene (rubber-like polymerized chloroprene), butyl rubber (rubber-like copolymer of olefins and diolefins), copolymer of butadiene and acrylonitrile, etc., used alone or in admixture with other synthetic which may be GR-S. The terms employed to describe the different reclaims are used to refer to the types of commercial products indicated.

Rubber compounders have objected to the reclaims obtained from the synthetic rubbers and mixtures of rubbers containing synthetics which have been on the market in recent years because they do not have the tensile and abrasion resistance of the natural rubber reclaim to which they have been accustomed. Several per cent of high-molecular-weight coumarone resin will improve the physical properties of these inferior reclaims so that their properties are comparable with the prewar reclaim obtained from natural rubber. A preferred embodiment of the invention, therefore, consists in its application to the reclaiming of synthetics and mixtures of natural rubber or natural rubber reclaim with synthetics to produce a reclaim comparable in properties to natural rubber reclaim.

The greater part of the resin employed is taken up by the stock treated. The reclaim produced includes not only this resin but a certain amount of heavy oil or oil of high distillation range originally present in the oil-resin blend which serves to plasticize the reclaim. The small amount of this oil required for most reclaims is not sufficient to spread out and cover the stock with the thin film of oil necessary to insure a uniform penetration of the stock for plasticization and devulcanization. Low-boiling oil is, therefore, usually added to the high-boiling oil and resin to give the oil-resin blend sufficient volume to produce this desired effect in the digester. During the blow-down from a wet digester (or exhaust from a pan digester) most of the low-boiling oil is vaporized and passes through the stack. There is left in the reclaim some of the light oil and most of the higher-boiling oil and resin which serve to plasticize the reclaim and give it the desired properties. The oil-resin blend of this invention, therefore, comprises a high-molecular-weight coumarone resin, a low-molecular-weight coumarone resin, and the oil which is preferably a blend of a heavy oil and a lighter oil.

The amount of the oil-resin blend lost at the blow-down of the wet digester (or the exhaust if a pan digester is used) will depend upon the composition of the oil in the oil-resin blend and the temperature at the blow-down or exhaust. The older digesters use a steam-pressure range of about 100 to 125 pounds of steam. Some of the digesters will carry 150 to 160 pounds of steam, and some are designed to carry up to 170 to 200 pounds. The latest types are designed to operate at pressures up to 250 pounds of steam. The blow-down temperatures of these various digesters, therefore, range from 336 to 406° F. The blow-down temperature of the latest equipment is far above that of the old-type digester and is, therefore, capable of operating with a less volatile oil; and the oil-resin blend employed with this type of equipment will contain more heavy oil than the blend used with the old-type equipment. The boiling range and percentages of the light oil and heavy oil used are, therefore, dependent upon the temperature of the digester at the time of the blow-down or exhaust. It is necessary to take into consideration the fact that the lighter components of the oil volatilized at the blow-down or exhaust will carry a certain amount of higher-boiling-range oils with them. It is, therefore, impossible for any operator to specify any one oil which will operate efficiently in all types of digesters.

The composition of the oil employed must be such that the acetone content of the finished reclaim is within that specified by the rubber compounders and will vary, depending upon the percentage of heavy oil which it is desired to retain in the finished reclaim, the amount of oil required to produce a film upon the scrap, the blow-down or exhaust temperature of the digester, and possibly other factors. The oil may be of any of the usual types, such as an oil derived from coniferous woods or an oil derived from petroleum or from the oils of coal, or the oil may be a mixture of these, with or without other ingredients. It may contain a chemical softener, of which there are a number on the market. The oil may be a straight distillate or a derivative, such as dipolymer oil, or a blend. Generally speaking, it should be paraffin free because the presence of paraffin tends to make the reclaim stringy. It should be substantially naphthalene free, or at most contain not more than about 4 per cent of naphthalene.

The oil preferred for use in carrying out this invention is derived from coal. The lower boiling oils are advantageously a heavy fraction from the light oil obtained in coke-oven operation. The heavy oil should have a boiling range of about 250 to 350° C. A preferred oil for use in the oil-resin blend is composed entirely of oil derived from coal. For the latest type digesters, 45 to 50 per cent of the total of this oil used in the oil-resin blend will distill below 300° C., and 50 to 55 per cent will distill over 300° C. and is composed largely of dipolymer oil, a derivative of the light oil from the distillation of coal or other heavy fractions from said oils. For the oldest type digester which operates at 100 to 125 pounds steam pressure, the total oil content of the oil-resin blend would not contain over 15 to 20 per cent of the above heavy-type oils.

The penetration of the scrap by the oil-resin blend in the digester appears to be initiated by heat and is possibly aided by moisture vapor. It appears that the light oil of the oil-resin blend film on the rubber scrap is the first to penetrate the scrap and that this opens up the scrap and that the heavy oil follows the light oil. The resin, apparently, follows the heavy oil. At any rate, there must be enough oil in the digester to give a thin film on the stock. Otherwise, the desired penetration and swelling and subsequent devulcanization are not uniform. The heavy oil which remains in the reclaim plasticizes it, as does the resin. As previously pointed out, the high-molecular-weight coumarone resins improve the tensile strength and abrasion resistance of the stock. The oil present in the reclaim assists in holding these resins there. Low-molecular-weight coumarone resin, if used, also assists in holding the high-molecular-weight coumarone resin in the reclaim and prevents its blooming.

Resins have heretofore been added to reclaims by compounders by milling the resin into the reclaim. Such milling is expensive. The compounder prefers to work with a reclaim which initially has properties approximating natural rubber reclaim. The uncompounded synthetic reclaim of this invention is given these properties by having incorporated in it a high-molecular-weight coumarone resin during the reclaiming process. By blending the resin with the reclaiming oil, the resin is incorporated in the reclaim without added expense, such as would be necessitated if the resin were milled into the reclaim, and the blend of the resin with the reclaim is more homogeneous than that obtained by milling.

The composition of the oil-resin blend and the amount of high-molecular-weight coumarone resin in the blend and the amount of the low-molecular-weight coumarone resin which is used with the high-molecular-weight coumarone resin in the blend will vary, depending upon the nature of the stock to be treated and the equipment used. Too much heavy oil will "mush" the stock and spoil the reclaim. In stock which comprises synthetic rubber and also natural rubber or natural rubber reclaim, particular care must be exercised to see that the oil-carrying base meets the requirements of each particular stock and the particular equipment employed. It is manifestly impossible to specify any hard and fast formula that would be satisfactory for all of the various general classes of rubber scrap which are subjected to reclaiming, such as natural rubber, recap or retread stock, a mixture of synthetic and either natural rubber or natural rubber reclaim, unmixed synthetics or mixtures of synthetics whether or not they contain or consist of types of GR–S rubbers. The following examples are, therefore, only illustrative. Fabric-free stock may be treated in pan digesters. Fabric-containing stock will be treated only in wet digesters, and a small amount of caustic soda or zinc chloride or other fabric-destroying agent will be used to aid in disintegration of the fabric. It is assumed that such a fabric-destroying agent is used in each of the examples relating to fabric-containing stock although the examples make no direct reference to it.

EXAMPLE 1

*Reclaim from recaps and retreads*

In recent years recapping and retreading have been done with synthetic rubbers and particularly the rubbers designated in the constructions coded by the Government, of which S-5 and S-7 are more particularly defined at the end of this specification. If the recap or retread is well worn down before the tire is scrapped, the amount of synthetic rubber present may not be high. If the tire is scrapped because of a sidewall blow-out (which is more apt to occur with recapped and retreaded tires than with new tires), the tread may not be worn down very far, and the scrap will contain a higher percentage of synthetic. One of the most widely used recapping and retreading formulae contains 70 per cent of GR-S and 30 per cent of natural rubber reclaim. It is, therefore, seen that the amount of synthetic rubber in recap and retread stocks will vary from perhaps 15 to 20 per cent in case of a worn tire to perhaps 50 per cent in the case of a tire with a side-wall blowout.

The recap and retread stock is notoriously dirty and poor. The final reclaim may not contain over 65 per cent of the original scrap in the form of finished slab. Some of the resin used is lost with the tailings. Assume that the oil-resin blend used contains 40 per cent of resin and 60 per cent of oil. Assume further that the treatment is to be carried out in a wet digester at 180 pounds steam pressure and that the oil used is derived from the oils of coal and about one third of the oil is a heavy oil boiling at 250 to 350° C. and the remaining two thirds is a lighter oil from the light oil from coke-oven operation. The heavy oil may be a derivative, such as a dipolymer oil or one of the heavy fractions. If 14 parts of this oil-resin blend are used with each 86 parts of the scrap, assuming that only 75 per cent of the scrap is recovered as reclaim slab, the resin content of the finished slab will be about 6 to 7 per cent. More or less resin than above contemplated may be lost in the tailings. The amount of stock recovered will vary and may be more or less than 75 per cent. About 4 to 8 per cent of resin in the finished slab is representative of what may be obtained. About 2 to 4 per cent of high-molecular-weight coumarone resin and 2 to 4 per cent of the lower-molecular-weight resin is recommended for natural rubber reclaim together with about 2 to 4 per cent of heavy oil boiling between about 250 and 350° C. This oil need not be derived from coal although such oil is preferred.

In the following examples an oil-resin blend of the general type described specifically in Example 1 may be used with such changes as are specified in each example.

EXAMPLE 2

*Natural rubber*

Natural rubber is relatively easily reclaimed. If treated with an oil-resin blend containing about 80 parts of oil (one third of which is heavy oil) and 20 parts of resin (composed of 5 parts of coumarone resin with a molecular weight of 700 or over and 15 parts of coumarone resin with a molecular weight of about 300 or 400 and not over about 500), using 10 parts of the oil-resin blend for 100 parts of rubber and heating 10 or 11 hours at about 175 pounds steam pressure or heating for even up to 13 hours or more at this pressure, a very satisfactory reclaim having good physical properties is obtained. The reclaim obtained will have a resin and heavy oil content within the range given in the above table.

EXAMPLE 3

The industry recognizes two types of synthetic scraps. Neither contains any natural rubber or natural rubber reclaim, such as is found in retreads and recaps. Either scrap may be composed substantially entirely of one particular synthetic, or it may be a mixture of synthetics. One of these industry-recognized scraps contains nothing but GR-S types of synthetics. The other may contain GR-S but contains other types of synthetics and may contain no GR-S.

Seventy parts of this latter type of scrap (which may be composed entirely or partly of Buna N equivalents, neoprene, butyl rubber, etc.) will be treated with about 30 parts of oil-resin blend composed of 40 per cent of resin and 60 per cent of oil. The oil is preferably all a heavy oil boiling in the range of 250 to 350° C. The resin will preferably be composed of up to 50 per cent of high-molecular-weight coumarone resin, the other 50 per cent being low-molecular-weight coumarone resin. Heating for 20 hours at 180 to 200 pounds steam pressure, a satisfactory reclaim is obtained. This reclaim will contain resins and heavy oil within the limits given in the above table.

EXAMPLE 4

The synthetic scrap used in carrying out this example is that first mentioned which is composed entirely of one or more types of GR-S. Providing the amount of high-carbon S-5 and S-7 present does not exceed about 15 to 20 per cent of the total, such scrap may be satisfactorily reclaimed by heating 70 parts of the scrap for about 20 hours at 190 pounds steam pressure with 30 parts of an oil-resin blend containing 60 parts of oil substantially all of which boils at over 250° C. and 40 parts of resin, half of which is high-molecular-weight coumarone resin and the other half of which is low-molecular-weight coumarone resin.

If there is a high percentage of S-5 or S-7, more resin will be required. Such additional resin, which is preferably low-molecular-weight coumarone resin, may be added at the digester. If more than a total of about 40 (or perhaps 50) per cent of resin is added to the oil, difficulty may arise in cold weather due to resin separation. Therefore, if more than such percentage of resin is used, it will be desirable to add the additional resin at the digester, and the heat of the material in the digester will dissolve the resin.

EXAMPLE 5

*Pan digestion*

Pan digestion is carried out at a lower temperature and is used for the treatment of stock which contains no fabric. Such stock may be tread peels (either natural rubber or synthetic) torn from tire carcasses. It may be inner-tube stock which may be butyl rubber or GR-S or the like.

A batch of GR-S tubes was very satisfactorily reclaimed using 30 parts of oil-resin blend to 70 parts of the scrap. The oil-resin blend contained 20 parts of high-molecular-weight coumarone resin and 20 parts of low-molecular-weight coumarone resin to 60 parts of oil substantially all of which boiled above 250° C.

With natural rubber tubes and butyl rubber tubes, 10 per cent or less of the oil-resin blend may be used, and the resin content may be lower, not over about 20 to 30 per cent. The oil may be only 25 per cent heavy oil with the balance a light oil which is given off as vapor at the exhaust. The resin may be composed of 20 to 40 per cent of high-molecular-weight coumarone resin, and the balance may be low-molecular-weight coumarone resin.

The mechanical steps of treating the various stocks with the various oil-resin blends do not differ from the ordinary reclaiming processes. During the reclaiming, carbon black, zinc oxide, and the like may separate from the rubber. The final reclaim will ordinarily be produced in slabs which will contain several per cent—perhaps up to 6 per cent or more—of a higher boiling oil and a small amount—perhaps only 4 or 5 per cent—of lighter oil and the mixture of resins.

It will be understood that the examples given are illustrative, and the temperatures, proportions, etc., referred to may be varied. For the treatment of natural rubber which contains no synthetic rubber, less resin is required than for the treatment of a synthetic or a blend of synthetic and natural rubbers. Thus, the oil-resin blend may contain as little as 5 per cent of high-molecular-weight coumarone resin and 5 per cent of low - molecular-weight coumarone resin. Larger amounts of resins will be employed in varying degrees, largely depending upon the amount of synthetic rubber present. For instance, for certain reclaiming operations an oil-resin blend may be preferred which contains as a minimum 10 or 15 per cent or more of each of these types of resins. For the reclaiming of scraps composed at least partially of GR–S rubber, the oil-resin blend will usually contain a minimum of at least 20 or 25 per cent of resins of which ⅕ to ½ is high-molecular-weight coumarone resin and the balance is low-molecular-weight coumarone resin. The type of equipment, operating temperature, etc., will determine the amount of resin required in the oil-resin blend. To obtain optimum results, the heavy oil content of the oil base will vary with the resin content, the type of equipment, operating temperature, etc. For the latest type of wet digester carrying 250 pounds steam pressure, the oil may be composed entirely of heavy oil boiling at over about 250° C. With old-type digesters (either pan or wet digesters) the oil base may be composed of as little as 15 per cent heavy oil boiling over about 250° C. and 85 per cent of a lower boiling oil substantially all of which is volatilized at the blow-down in the case of a wet digester and at the exhaust of a pan digester.

S–5 denotes 100% GR–S tread on a natural rubber carcass, except that:

Crude rubber may be used only in cements, in tread and side-wall splice gum strips and in the tire body, but only to extent permitted by the "maximum content crude rubber" designated.

S–7 denotes approximately 35% GR–S and 65% crude rubber, distributed throughout the tire at the manufacturer's discretion, except that:

Crude rubber may be used only to the extent permitted by the "maximum content crude rubber" designated.

What I claim is:

1. An oil-resin blend for reclaiming sulfur-vulcanized rubber scrap, which blend contains substantially 10 to 50 parts by weight of resin and 90 to 50 parts by weight of an oil in which the resin is soluble at reclaiming temperatures and which contains a fraction which is of such high boiling range that it is not lost in the blow-down after digestion of the rubber scrap, which oil penetrates and swells the rubber scrap, is substantially free from paraffin, contains no more than four per cent of naphthalene, and plasticizes reclaim produced from the scrap; substantially twenty-five to fifty per cent of the resin being a resin of the class consisting of coumarone polymers, coumarone-indene copolymers and indene polymers with a molecular weight over 700 and substantially all of the balance of the resin being a resin of the class consisting of coumarone polymers, coumarone-indene copolymers and indene polymers with a molecular weight not over 500.

2. The method of reclaiming rubber scrap referred to in claim 1 which comprises heating the scrap while in contact with the oil-resin blend referred to therein.

3. An oil-resin blend for reclaiming sulfur-vulcanized rubber scrap, which blend contains substantially 40 to 50 parts by weight of resin and 60 to 50 parts by weight of an oil in which the resin is soluble at reclaiming temperatures and which contains a fraction which is of such high boiling range that it is not lost in the blow-down after digestion of the rubber scrap, which oil penetrates and swells the rubber scrap, is substantially free from paraffin, contains no more than four per cent of naphthalene, and plasticizes reclaim produced from the scrap; the resin being substantially entirely resin of the class consisting of coumarone polymers, coumarone-indene copolymers and indene polymers, with at least substantially 20 of said parts being a resin with a molecular weight over 700 and at least substantially 20 of said parts being a resin with a molecular weight not over 500.

4. The method of reclaiming rubber scrap referred to in claim 3 which comprises heating the scmrap while in contact with the oil-resin blend referred to therein.

5. An oil-resin blend for reclaiming sulfur-vulcanized rubber scrap, which blend contains substantially 60 parts by weight of oil and 40 parts by weight of resin of the class consisting of coumarone polymers, coumarone-indene copolymers and indene polymers; substantially 50 per cent of the resin having a molecular weight of substantially 700 to 800 and 50 per cent having a molecular weight not over 500; the oil being derived from coal, substantially all of it boiling in the range of 250° to 350° C. with substantially 50 to 55 per cent distilling over 300° C. and being composed largely of dipolymer oil, the blend being substantially free from paraffin and containing no more than four per cent of naphthalene.

6. The method of reclaiming synthetic rubber scrap which contains vulcanizate of rubber-like copolymer of butadiene and styrene which comprises heating the same with the oil-resin blend of claim 5.

CHARLES HERBERT CAMPBELL.

(References on following page)

REFERENCES CITED

The following references are of record in the file of this patent:

UNITED STATES PATENTS

| Number | Name | Date |
|---|---|---|
| 2,319,959 | Tierney | May 25, 1943 |
| 2,324,980 | Kilbourne | July 20, 1943 |
| 2,366,219 | Soday | Jan. 2, 1945 |
| 2,400,565 | Merrill | May 21, 1946 |

OTHER REFERENCES

Neville Resins and Plasticizers, 1945, pages 46 and 47. (Copy in division received February 5, 1945.)

E. I. du Pont de Nemours: informal Reports on Neoprene, Blue Sheet, 153, pages 1 and 2. (Copy in Division 50, dated March 31, 1944.)

Certificate of Correction

Patent No. 2,468,482.  April 26, 1949.

CHARLES HERBERT CAMPBELL

It is hereby certified that errors appear in the printed specification of the above numbered patent requiring correction as follows:

Column 7, line 63, after the word and period "digester." and before line 64, beginning with "S-5 denotes" insert the following paragraph—

*In the examples the different types of rubber constructions are designated by code numbers established by the government and identified in publication A-1 of the War Production Board, August 25, 1944, (as amended), as follows:* line 68, before "extent" insert *the*; column 8, lines 39 and 40, claim 3, for "plasticizers" read *plasticizes*; line 50, claim 4, for "scmrap" read *scrap*;

and that the said Letters Patent should be read with these corrections therein that the same may conform to the record of the case in the Patent Office.

Signed and sealed this 30th day of August, A. D. 1949.

[SEAL]

THOMAS F. MURPHY,
*Assistant Commissioner of Patents.*